(12) United States Patent
Guntur et al.

(10) Patent No.: US 8,089,882 B2
(45) Date of Patent: Jan. 3, 2012

(54) LOAD-AWARE NETWORK PATH CONFIGURATION

(75) Inventors: Ravindra Guntur, Bangalore Karnataka (IN); Rangaprasad Sampath, Bangalore Karnataka (IN); Anand Eswaran, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 331 days.

(21) Appl. No.: 11/849,364

(22) Filed: Sep. 4, 2007

(65) Prior Publication Data

US 2008/0232276 A1 Sep. 25, 2008

(30) Foreign Application Priority Data

Mar. 23, 2007 (IN) .............................. 600/CHE/2007

(51) Int. Cl.
*H04L 12/28* (2006.01)

(52) U.S. Cl. ........ 370/235; 709/223; 709/224; 709/225; 709/226

(58) Field of Classification Search .......... 370/229–256; 709/223–226
See application file for complete search history.

(56) References Cited

U.S. PATENT DOCUMENTS

| | | | |
|---|---|---|---|
| 5,953,318 A | 9/1999 | Nattkemper et al. | |
| 6,754,216 B1* | 6/2004 | Wong et al. | 370/395.42 |
| 2001/0030945 A1* | 10/2001 | Soga | 370/238 |
| 2002/0073226 A1* | 6/2002 | Sridhar et al. | 709/235 |
| 2002/0174246 A1* | 11/2002 | Tanay et al. | 709/238 |
| 2004/0047300 A1* | 3/2004 | Enomoto et al. | 370/256 |
| 2005/0108368 A1 | 5/2005 | Mohan et al. | |
| 2005/0169280 A1* | 8/2005 | Hermsmeyer et al. | 370/395.51 |
| 2006/0013230 A1* | 1/2006 | Bosloy et al. | 370/395.42 |
| 2006/0072505 A1* | 4/2006 | Carrillo et al. | 370/331 |
| 2007/0053369 A1* | 3/2007 | Mizutani et al. | 370/401 |
| 2008/0005086 A1* | 1/2008 | Moore | 707/3 |
| 2008/0089245 A1* | 4/2008 | Reichstein et al. | 370/256 |
| 2008/0232276 A1 | 9/2008 | Guntur et al. | |

* cited by examiner

*Primary Examiner* — Hassan Kizou
*Assistant Examiner* — Charles C Jiang (57) ABSTRACT

Load-aware spanning tree reconfiguration includes determining volumes for information flows in an existing spanning tree in a network. The spanning tree is reconfigured based on the volumes to provide higher-volume information flows with shorter paths in the reconfigured spanning tree.

18 Claims, 11 Drawing Sheets

FIG. 8

LOAD-AWARE NETWORK PATH CONFIGURATION

BACKGROUND

A computer network typically comprises a plurality of interconnected nodes. A node may include end user devices, switches, servers, or other devices that transmit or receive data. Switches may include routers, bridges and other types of switches. Switches are used to efficiently transmit data in the network. Switches are in general network devices which segregate information flows over various segments of a computer network. A segment is any subset of the network computing environment including devices and their respective interconnecting communication links.

A common type of computer network is a local area network (LAN) which typically refers to a privately owned network within a single building or campus. LANs typically employ a data communication protocol, such as Ethernet, FDDI or token ring, defining the functions performed by the data link and physical layers, which are layer 1 and layer 2 in the Open Systems Interconnection (OSI) model. Multiple LANs may be connected to form a wide area network (WAN). Also, LANs may be connected to the Internet.

Most computer networks, including LANs, are either partially or fully meshed. That is, they include redundant communications paths so that a failure of any given link or node does not isolate any portion of the network. The existence of redundant links, however, may cause the formation of "loops" within the network. Loops are highly undesirable because data may traverse the loops indefinitely. Furthermore, because switches may flood, broadcast, or multicast packets, the existence of loops may cause a proliferation of data so large that the network becomes overwhelmed.

To avoid the formation of loops, most switches execute a spanning tree protocol which allows them to calculate an active network topology that is loop-free (i.e., a tree) and yet connects every node with the LAN (i.e., the tree is spanning). The Institute of Electrical and Electronics Engineers (IEEE) has promulgated the 802.1D standard that defines a spanning tree protocol to be executed by 802.1D compatible devices.

The standard spanning protocol is a naive mechanism for generating a network topology for data transmission. The spanning tree protocol is not sensitive to changing traffic in the system or types of data being transmitted. For example, if links in the tree experience heavy traffic, application data being transmitted on those links may suffer, such as experiencing high latency and high packet loss. Quality of service (QoS) sensitive applications, such as streaming video, video conferencing, voice over Internet protocol (VoIP), and graphic-intensive multiplayer games, may suffer severe degradation in quality that is unacceptable to users. Furthermore, in large networks, it may not be feasible or cost effective for one or more system administrators to monitor the network and make decisions on assigning different paths to different information flows.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS

For simplicity and illustrative purposes, the present invention is described by referring mainly to exemplary embodiments. In the following description, numerous specific details are set forth in order to provide a thorough understanding of the embodiments. It will be apparent however, to one of ordinary skill in the art, that the embodiments may be practiced without limitation to these specific details. Well known methods and structures may not be described in detail, so as not to unnecessarily obscure the description of the embodiments.

According to embodiments described herein, network path configuration is performed to optimize network paths based on information flows. According to an embodiment, a spanning tree is automatically reconfigured to accommodate information flows that have a disproportionately high volume of traffic. In addition, a spanning tree may also be automatically reconfigured to accommodate different types of data in flows, such as flows having different QoS requirements. For example, flows may be prioritized based on the type of data being transmitted in the flows and/or the volume of traffic in the flows, and the spanning tree may be automatically reconfigured based on the prioritized flows. For example, flows having more stringent QoS requirements, such as a streaming media flow versus a bulk transfer of data, are given a higher priority and may be assigned to higher bandwidth paths in the spanning tree as a result of the reconfiguration. A spanning tree may also be automatically reconfigured to satisfy objectives, such as load sharing and other objectives.

An information flow, also referred to as a flow, includes information transmitted in the network. The information in a flow may be transmitted as blocks of data, and the blocks have one or more parameters in common. For example, the information is transmitted in packets in a LAN. The packets in a single flow have one or more common parameters. For example, all the packets in the flow have the same source and destination address pair.

Packets as is known in the art include, in addition to payloads, embedded control and addressing information in a header that identify the source device which originated the transmission of the packet and that identify the destination device to which the packet is transmitted. Identification of source and destination devices may be by means of an address associated with each device. The addresses are referred to as the source and destination address pair and are typically provided in the packet header. An address is an identifier which is unique within the particular computing network to identify each device associated with the network. Such addresses may be unique to only a particular network environment (i.e., a network used to interconnect a single, self-contained computing environment) or may be generated and assigned to devices so as to be globally unique in co-operation with networking standards organizations. For example, the addresses may be media access control (MAC) addresses of devices in a LAN.

A source and destination address pair is one type of parameter for determining whether information belongs to a particular flow. Other parameters may also be used to determine whether information belongs to a flow.

Volume of an information flow is the amount of traffic in the flow for a period of time. This may include number of packets in a flow. Thus, packet counts may be determined to determine the volume of an information flow. Packet counts may include a count of each packet in a flow or a sample of packets. An example of a sample is incrementing a counter after a predetermined number of packets in the flow have been received. For example, a counter for a flow is incremented every $10^{th}$ packet. Packet counts may be performed at network switches. In most low level network communications, such as layer 2 communications in a LAN, the MAC addresses are used for routing. For each flow, packets having MAC addresses specific to the flow are counted at the switches. Using the volumes, a spanning tree is reconfigured to provide greater bandwidth to flows that have a disproportionately high volume of packets.

Figure 1:
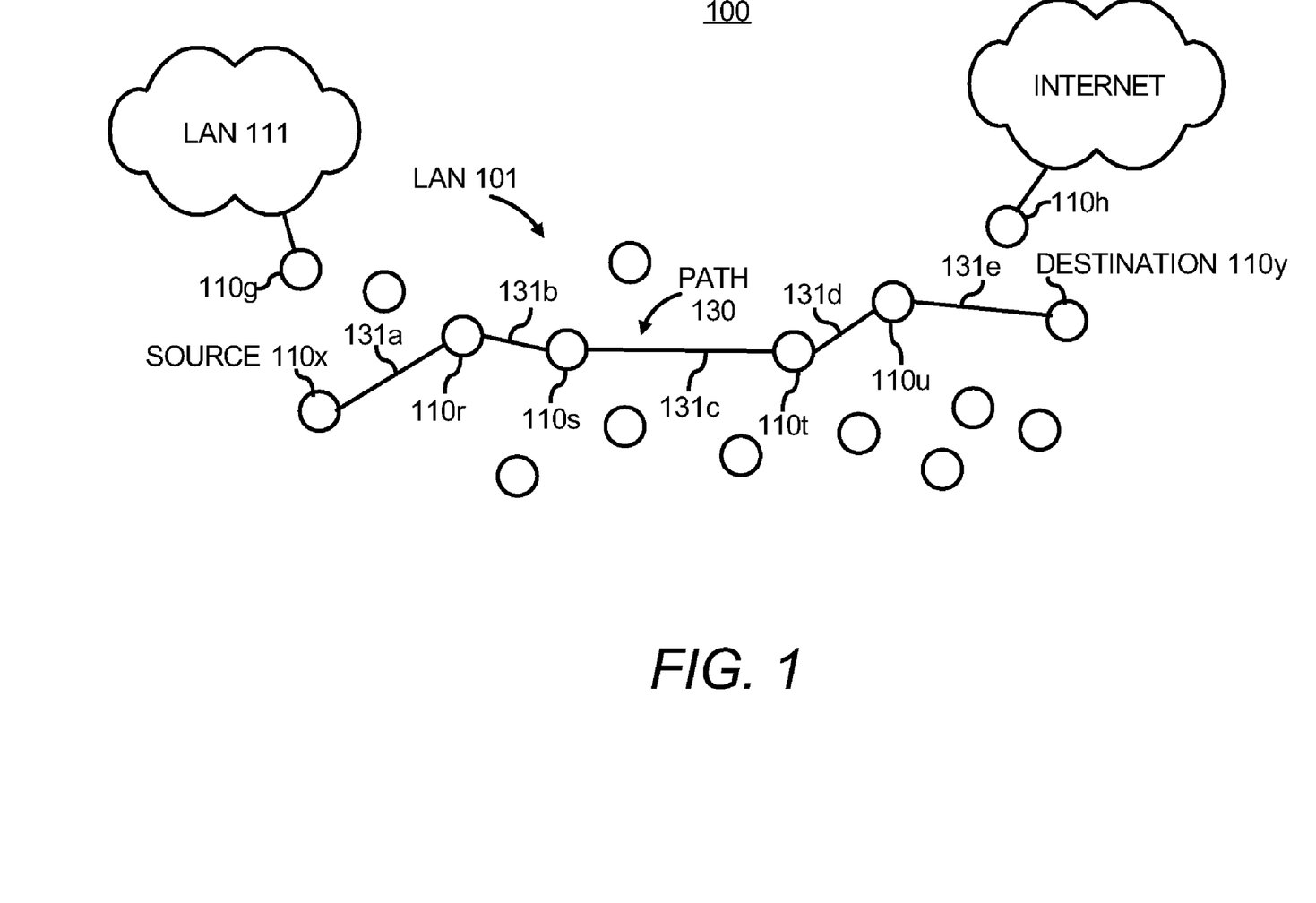
FIG. 1 illustrates a network including nodes, according to an embodiment.

FIG. 1 illustrates a system 100, according to an embodiment. The system 100 includes a LAN 101 comprised of nodes 110. A node is any device that may send and/or receive messages via the network and that is typically operable to perform some type of data processing. Examples of nodes include routers and other switches, servers, and end-user devices, such as personal digital assistants (PDAs), personal computers, laptops, etc.

Nodes 110 that are switches are operable to route data in the network 100 along network paths. For example, FIG. 1 shows a source node 110x and a destination node 110y. The source node 110x, for example, is a server and the destination node 110y is a client device, such as a user's personal computer (PC). A path 130 between the source node 110x and the destination node 110y includes links 131a-e and intermediate nodes 110r-u. The intermediate nodes 110r-u may be switches routing data between the source node 110x and the destination node 110y.

Figure 2:
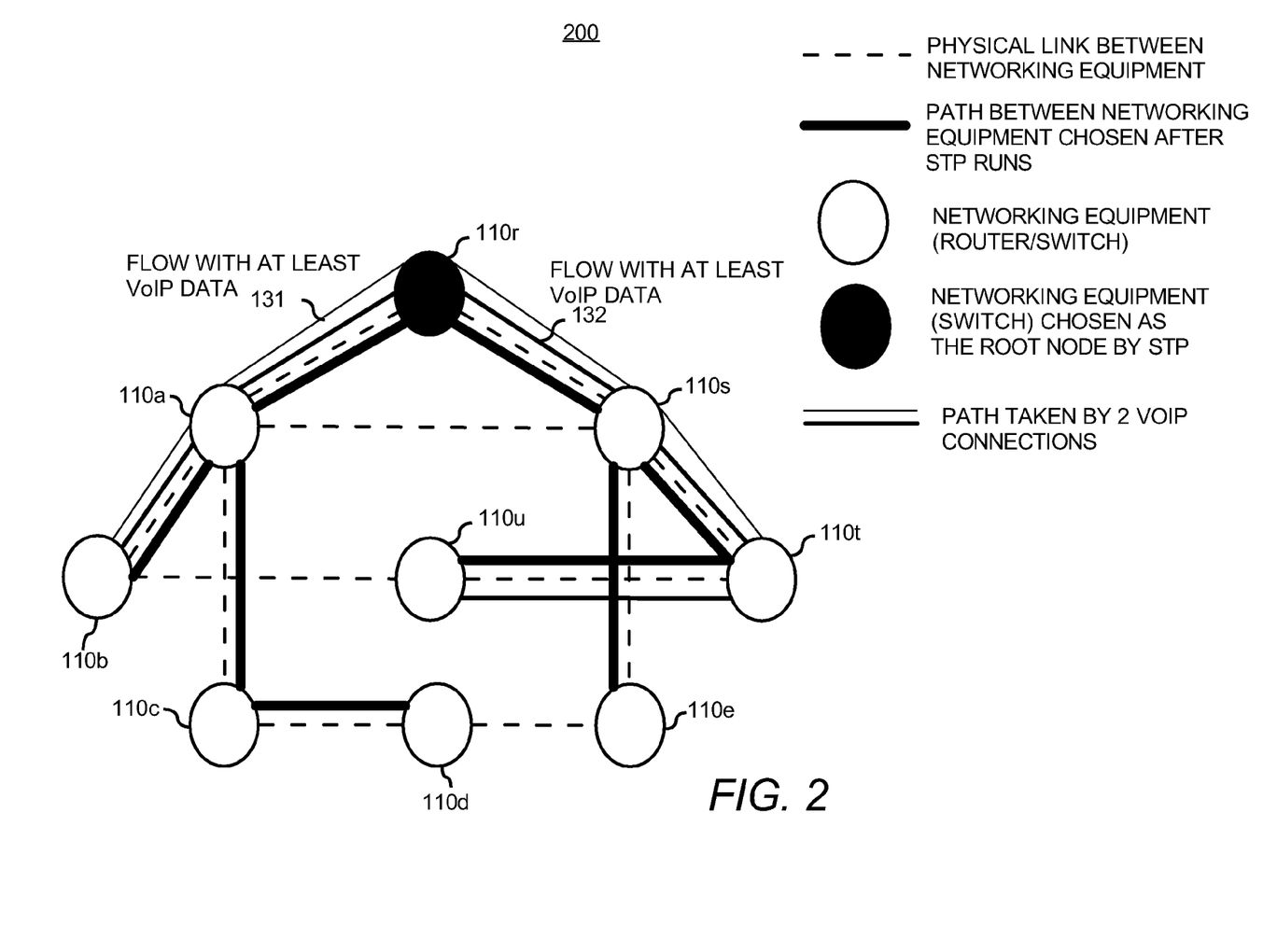
FIG. 2 illustrates a spanning tree, according to an embodiment.

In one embodiment, the switches in the LAN 101 are organized as a spanning tree. As is known in the art, a spanning tree, for example, generated using the 802.1D spanning tree protocol (STP) is a loopless configuration including a root node and paths between the nodes in the tree. As a consequence of running STP, a single path may be provided from source to destination. The node 110r, for example, is the root node and the other switches in the LAN 101 are leaves in the spanning tree. The switches in the LAN 101 may be layer 2 devices that route packets in the paths in the spanning tree using the packets' MAC addresses. For example, each switch may include multiple incoming and outgoing ports. Each switch may also include a table of MAC addresses and associated ports for the MAC address. When a packet arrives on an incoming port, a table lookup may be performed to identify the corresponding outgoing port to route the packet along a path in the spanning tree. The path 130, for example, represents a path in the spanning tree. The path 130 includes links 131a-e. The switches 110r-u route packets along the path 130 using MAC address-port relationships stored in their tables. FIG. 2 illustrates paths and flows in a spanning tree, which is described in detail below.

The LAN 101 may be connected to other LANs, such as the LAN 111, and/or the Internet. Edge routers, such as nodes 110g and 110h, may provide gateways to other LANs, the Internet, or other networks.

It will be apparent to one of ordinary skill in the art that the system 100 and the LAN 101 are examples of systems and networks that the embodiments described herein may be practiced. The embodiments described herein may be practiced in other systems and networks as well.

FIG. 2 illustrates a spanning tree 200. The node 110r is the root node and the other nodes, 110s-u and 110a-e, are also in the spanning tree. All the nodes in a network may be included in a spanning tree and the spanning tree 200 may be considered a partial topology for all the nodes 110 in the LAN 101 shown in FIG. 1.

FIG. 2 shows physical connections between the nodes, which may include wired connections between the nodes. Also, shown are paths in the spanning tree 200. Flows travel along the paths. For example, the flow 131 follows the path through the nodes 110b, 110a, and 110r-t. Another flow 132 follows the path through the nodes 110b, 110a, and 110r-u. Other flows follow other shown paths. Each flow may include packets. For example, packets with the same source and destination pair are provided in a flow. Each flow may include different types of data. For example, the flow 131 may carry voice over IP (VoIP) data and streaming video between the same source and destination. The flow 132 may include two different VoIP connections. As shown, the flow 131 between the source node 110b and the destination node 110t includes at least VoIP data. As shown, the flow 132 between the source node 110b and the destination node 110u includes at least VoIP data.

The nodes shown in FIG. 2 may be switches, and the switches may determine volume for each flow. For example, packets for each flow may be counted and stored at each switch. In addition to packet counts, other information about a flow may be stored, such as type of data, etc.

Figure 3A:
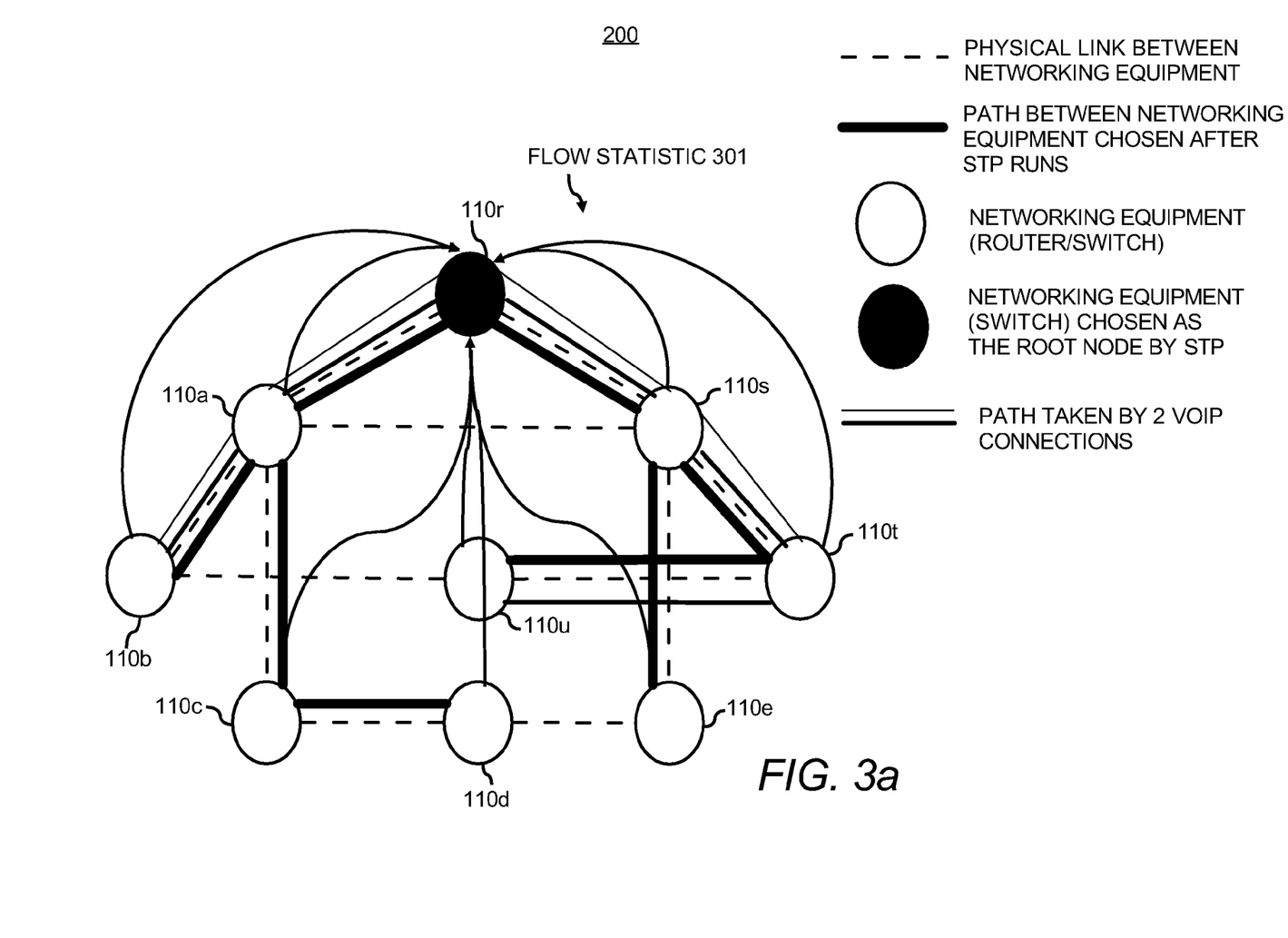
FIGS. 3a-c illustrate reconfiguring a spanning tree, according to an embodiment.

FIG. 3a illustrates the nodes 110r-u and 110a-e determining flow statistics, such as packet counts, types of data in the flow, latency, etc., and the nodes 110s-u and 110a-e send the flow statistics 301 to the root node 110r. For example, upon start-up, each switch, such as each of nodes 110r-u and 110a-e, broadcasts a message containing its ID. The switches may use IDs that are larger than the largest valid host address for that subnet so there is no conflict between hosts, which have lower-value IDs, and switches, which have higher-valued IDs. Then, a spanning tree is generated and each node sends a message containing its set of neighbors, i.e., the adjacency list, to the current root node in the resulting spanning tree. As soon as the designated ports are assigned and the data paths for switching are functional in the spanning tree, each switch/router enables volume determination for flows. For example, each switch/router enables counting of packets between each source-destination pairs by incrementing relevant counters.

In one embodiment, a counter is provided for each flow and a counter for the flow is selected by hashing a value, such as hashing a source and destination pair corresponding to the flow when a packet for the flow is received. Then, the selected counter is incremented. Count values may be incremented based on packets received at an ingress port or packets being transmitted on an outbound port. The flow volumes, which may include the counter values are transmitted to the root node as flow statistics, such as shown in FIG. 3a by the flow statistics 301 being transmitted to the root node 110r.

Figure 3B:
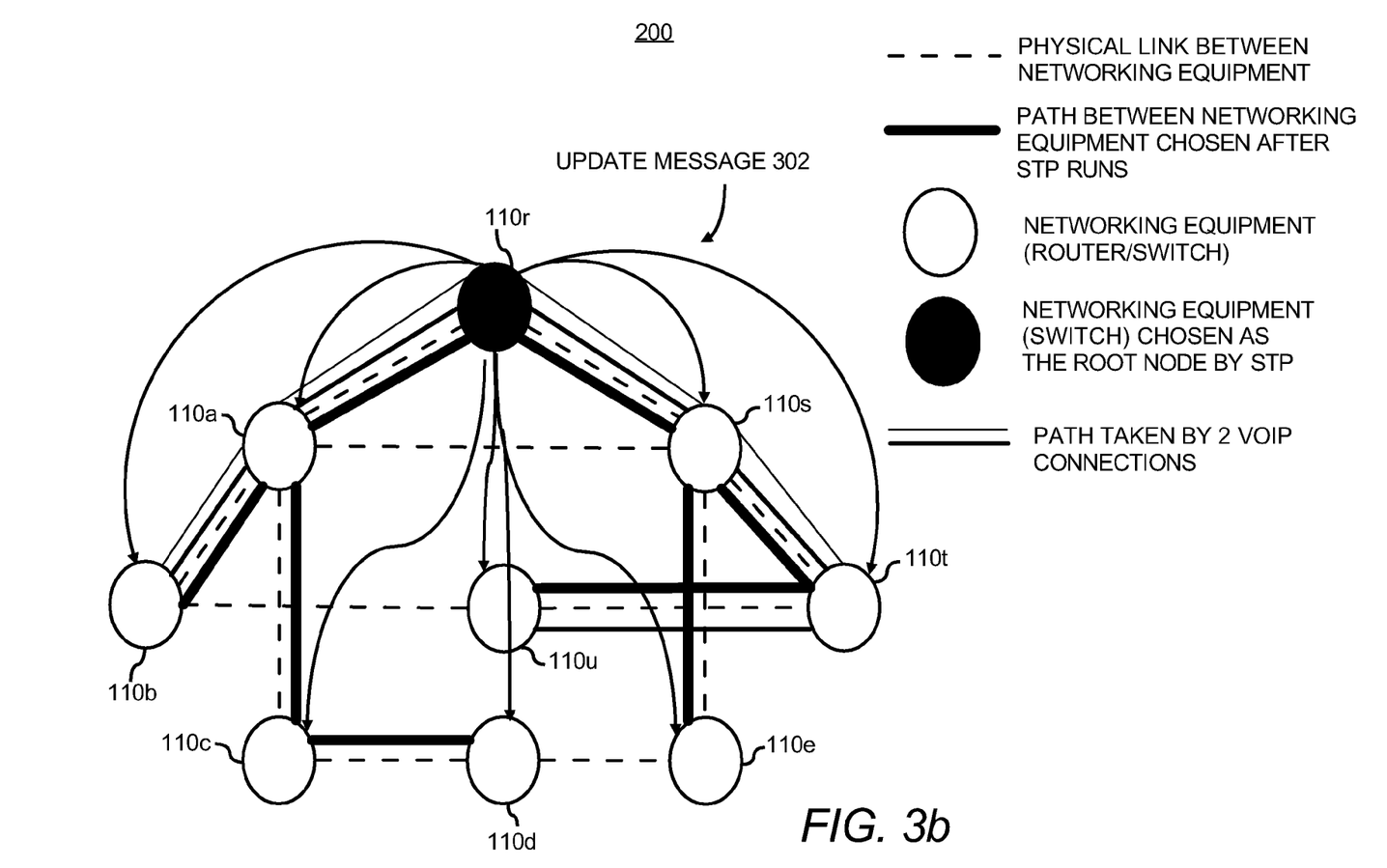

In FIG. 3b, the root node 110r reconfigures the spanning tree by calculating optimal paths based on the flow statistics 301 and flow statistics captured at the root node 110r. The reconfigured spanning tree may include a new root node and new paths. The root node 110r sends update messages 302 to the nodes 110s-u and 110a-e for configuring the new spanning tree. The update messages 302 include information for each node to reconfigure the spanning tree, such as identification of the new root node and a new adjacency list for each node. The new adjacency list is used to determine which neighbors to exclude in the new spanning tree, and is used by each node to block and unblock ports that result in the reconfiguration of the spanning tree. Also, a message is sent to the new root from the current root handing over control to the new root, so the new root knows that it needs to function as the new root.

Figure 3C:
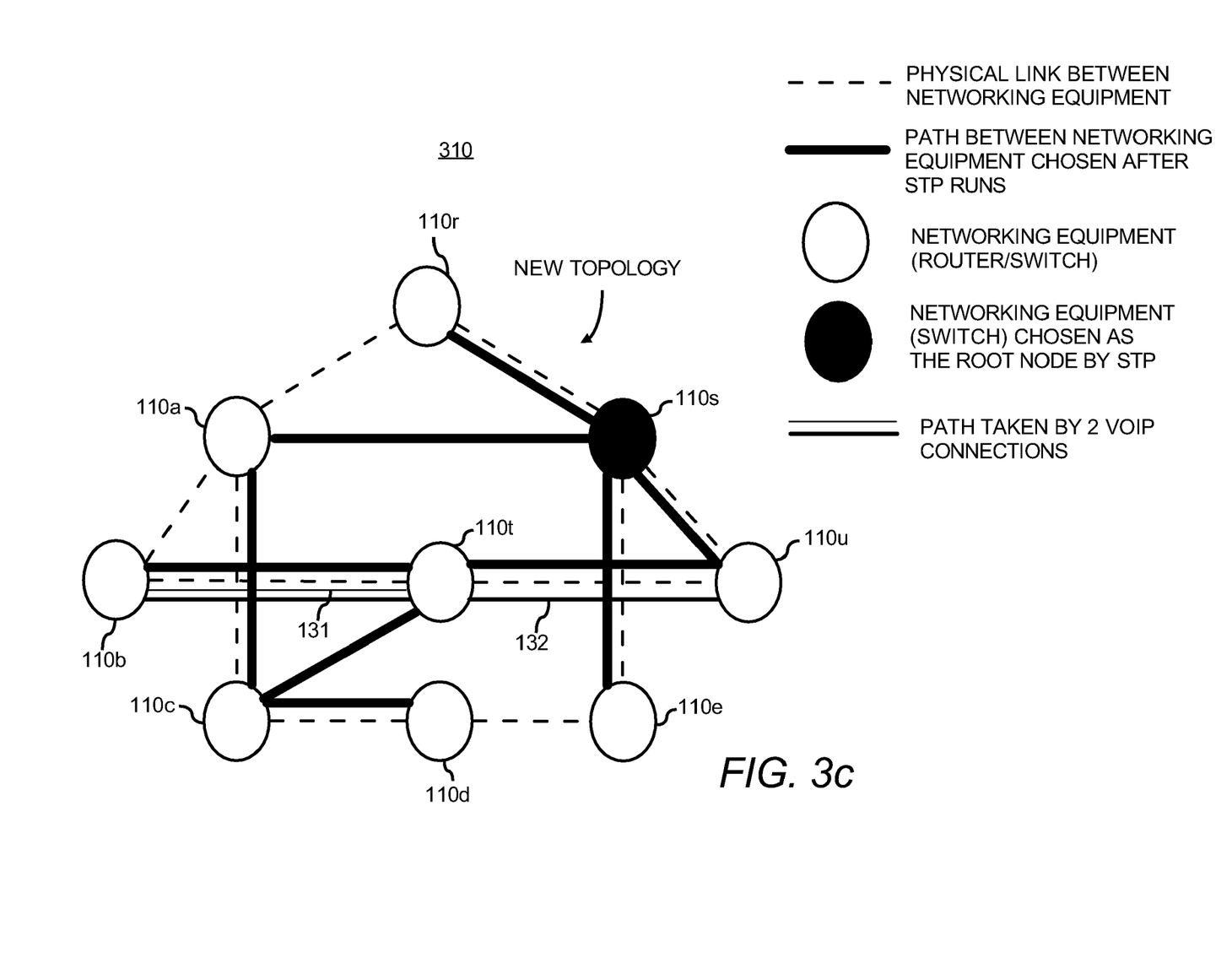

FIG. 3c shows a topology of the new spanning tree 310. For example, the new root node is the node 110s. The flow 131 now has a shorter path. For example, the flow 131 may have a disproportionately high volume when compared to the other flows and includes data with strict QoS requirements, such as at least VoIP data and possibly also includes streaming video. Thus, the flow 131 is given a shorter path in the reconfigured spanning tree 310. Other flows may have the same or different paths based on the flow statistics considered when calculating the new paths. The flow 132 is also assigned to a shorter path, because the flow 132 may have high volume and/or the flow 132 carries a specific type of data such as VoIP data.

Figure 4A:
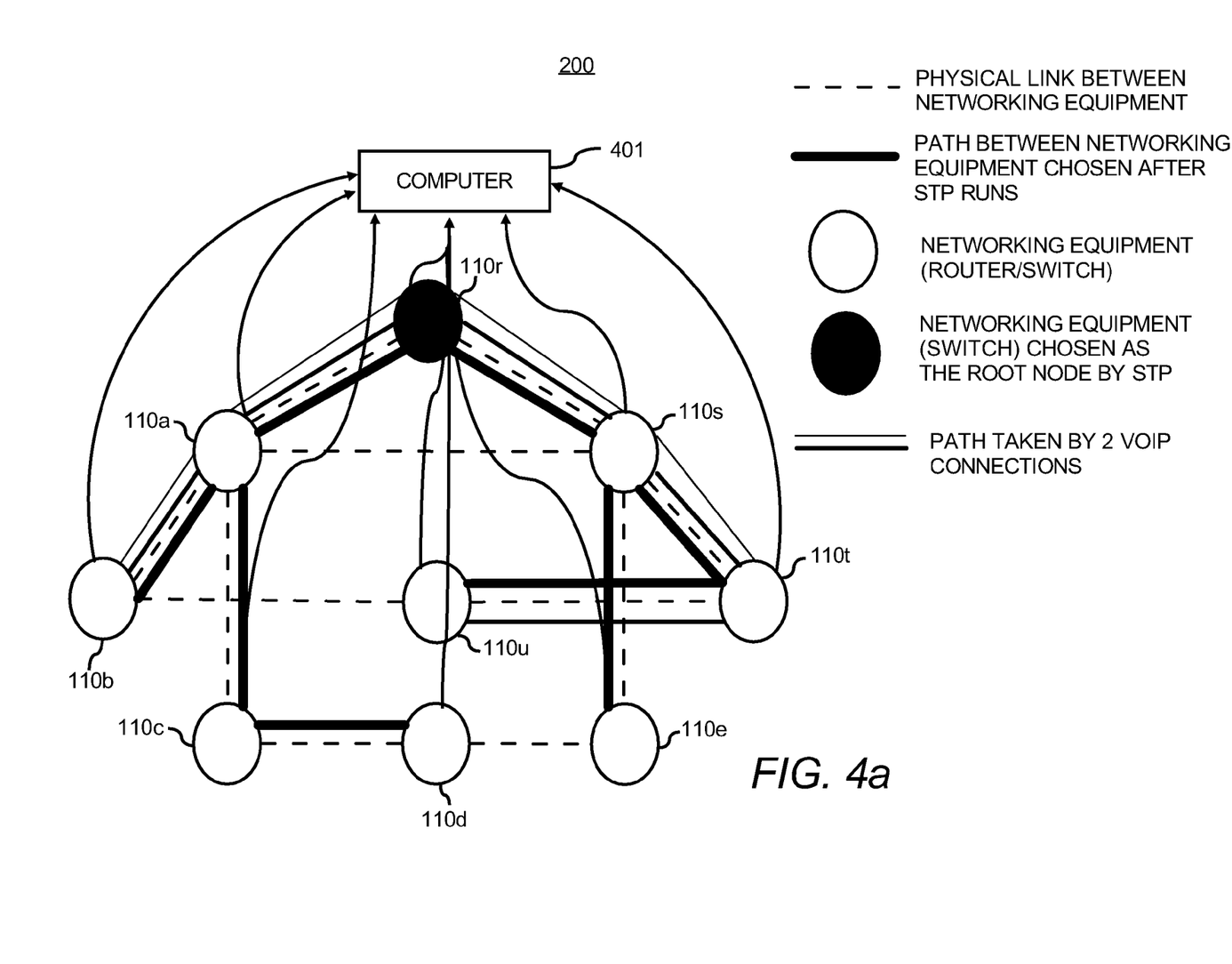
FIGS. 4a-b illustrate reconfiguring a spanning tree, according to another embodiment.
Figure 4B:
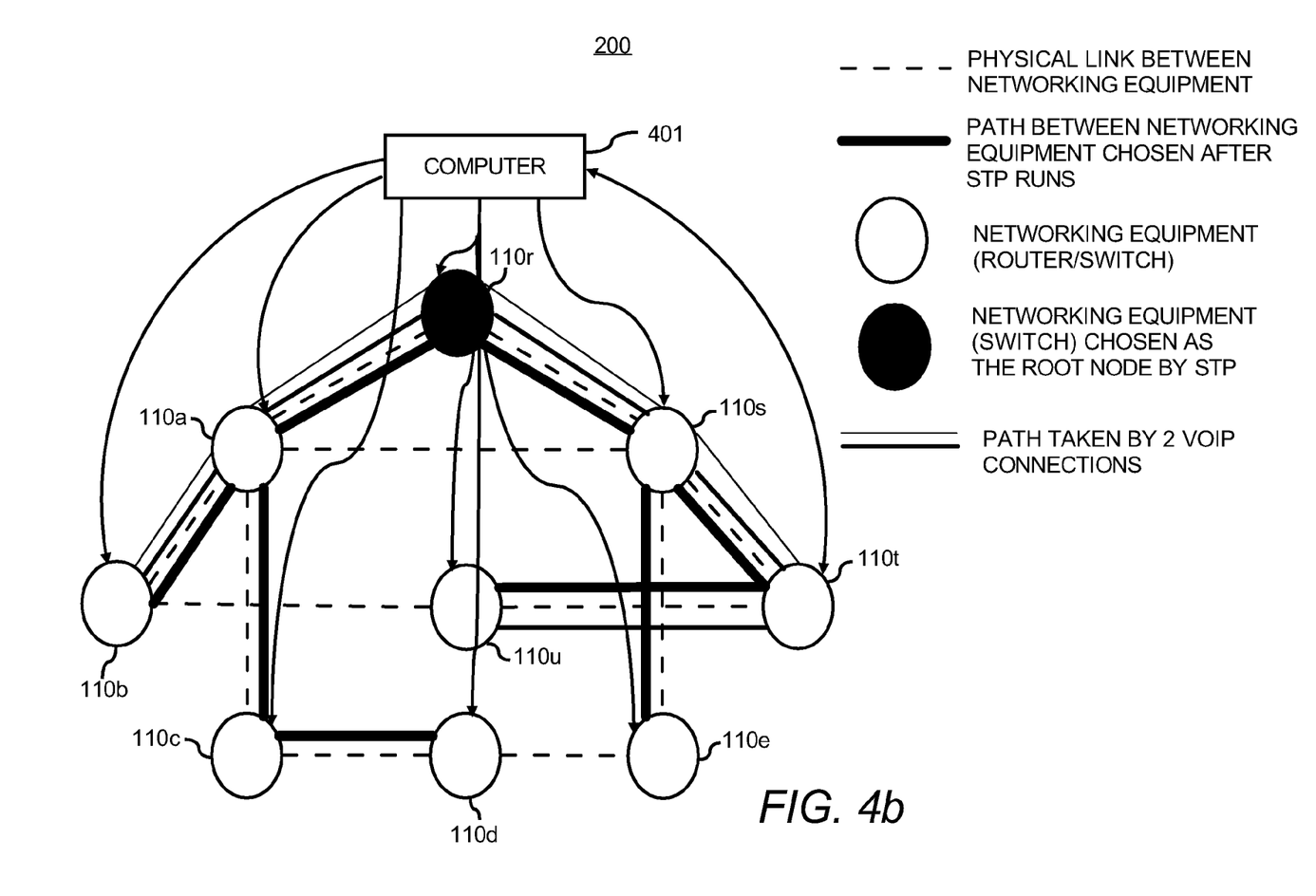

FIGS. 4a-b are similar to FIGS. 3a-b except flow statistics are sent to a node that is not the root node. For example, the computer system 400 receives the flow statistics 300 and reconfigures the spanning tree. The computer system calculates optimum paths based on the flow statistics and sends the update messages 302 to the nodes, as shown in FIG. 4b. The new spanning tree 310 is created and shown in FIG. 3c. Thus, a node other than a root node may reconfigure the spanning tree. The node, for example, is a computer system operable to communicate with the switches and other nodes in the network to reconfigure and implement a new spanning tree.

Figure 5:
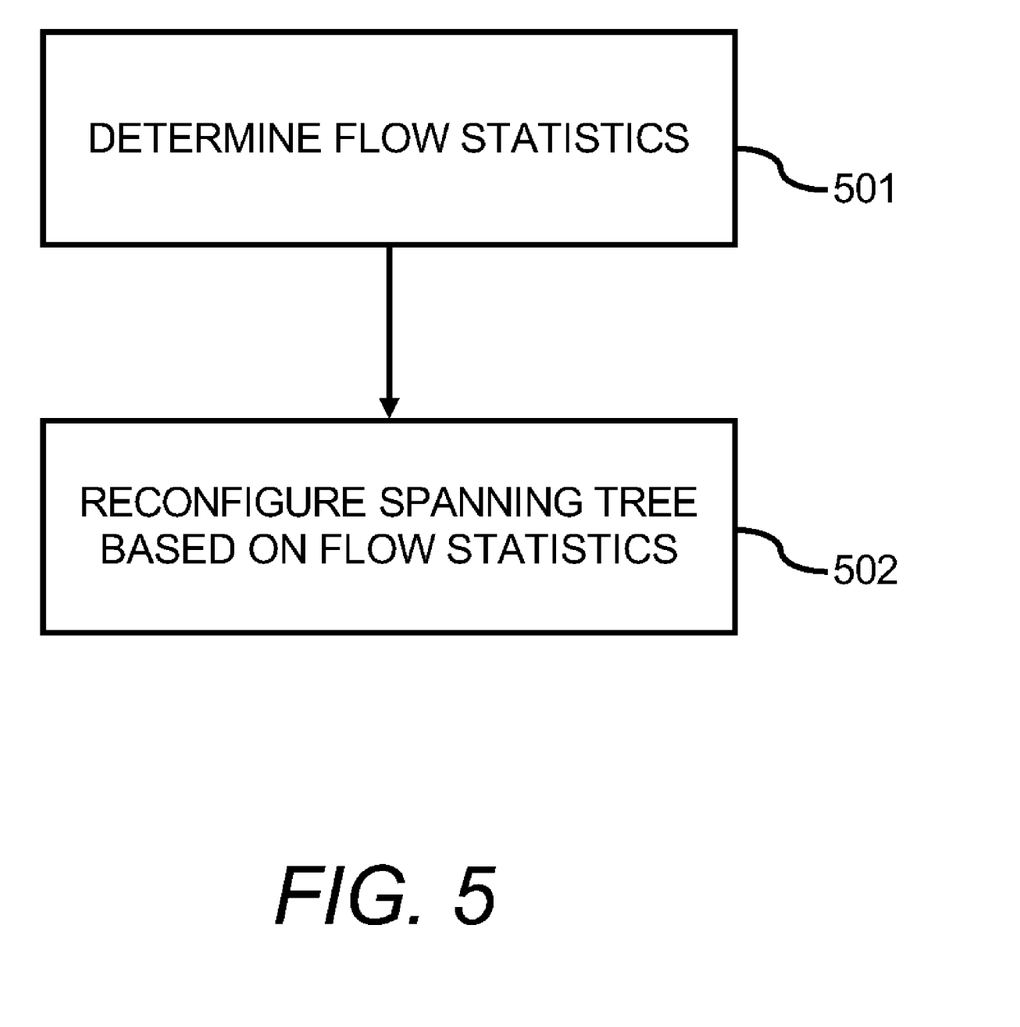
FIG. 5 illustrates a flow chart of a method for automatically reconfiguring network paths based on statistics for information flows, according to an embodiment.

FIG. 5 illustrates a flow chart of a method 500 for automatically reconfiguring network paths based on statistics for information flows, according to an embodiment. The method 500 is described with respect to one or more of FIGS. 1-4c by way of example and not limitation.

At step 501, flow statistics are determined for information flows traveling along existing network paths. The flow statistics include volume for the information flows. The flow statistics may also identify the types of data be transmitted in the flows and possibly other parameters about the flows.

For example, the spanning tree 200 includes flows 131 and 132 shown in FIG. 2. Switches in the paths determine the flow volumes. For example, the nodes 110r-u determine the volume for the flow 131 by parsing the header of each received packet to identify a source address and a destination address. An information flow corresponding to the identified source address and destination address is identified if packets for the flow were previously received. A counter for the information flow 131 is incremented for each received packet in the flow. Other flow statistics may also be determined and stored at each node, and transmitted to a node for reconfiguring the spanning tree.

At step 502, the spanning tree is reconfigured based on the flow statistics. In one embodiment, spanning tree is reconfigured based on the flow volumes to provide the higher-volume information flows with shorter paths in the reconfigured spanning tree. For example, the root node 110r shown in FIGS. 3a-b or the computer system 400 shown in FIGS. 4a-b receives the flow statistics 301 and reconfigures the spanning tree based on the flow statistics. As shown in FIG. 3c, the flow 131 is given a shorter path, for example, because it has a higher volume than the other flows. Other flow statistics may also be considered when reconfiguring the spanning tree. For example, flows carrying data with stringent QoS requirements may be assigned to higher bandwidth and lower latency paths such that the QoS requirements for the data are satisfied. For example, streaming video or VoIP data may have a predetermined maximum latency. If the maximum latency is exceeded, the streaming video or VoIP connection may be degraded beyond user satisfaction. Thus, the streaming video or VoIP connection is assigned to a lower latency path in the spanning tree.

The method 500 may be invoked if any flow volumes are disproportionately high or may be invoked at predetermined intervals. For example, if the number of packets for a flow exceeds a threshold as determined at a switch, such as one of the nodes 110r-u or 110a-e shown in FIGS. 2, 3a-b and 4a-b, the node sends flow statistics to the node operable to reconfigure the spanning tree, such as the root node 110r or the computer system 400. That node may request and receive flow statistics from all the other switches in the spanning tree, and reconfigure the spanning tree based on the flow statistics. The flow with the packet count exceeding the threshold may be assigned to a path with greater bandwidth.

A node, such as the root node 110r or the computer system 400, may also invoke the reconfiguration. For example, the root node 110r or the computer system 400 requests the node to send flow statistics captured during a predetermined interval. The root node 110r or the computer system 400 may request that each node sends its flow statistics at different times to avoid flooding the network and the receiving node and to avoid data collisions. The root node 110r or the computer system 400 then reconfigures the spanning tree based on the flow statistics.

Figure 6:
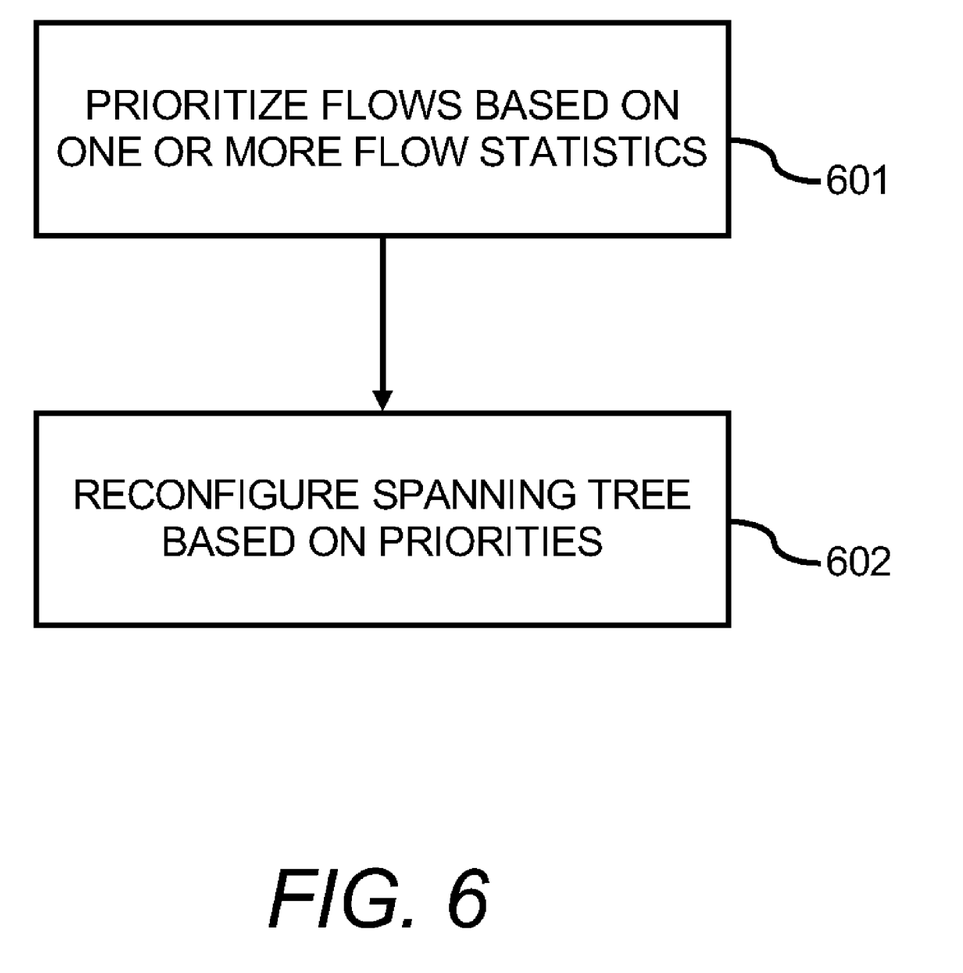
FIG. 6 illustrates a flow chart of a method for calculating optimum paths for information flows in a spanning tree, according to an embodiment.

FIG. 6 illustrates a method 600, according to an embodiment, for calculating optimum paths for information flows in a spanning tree. The steps of the method 600 may be sub-steps of the step 502 of the method 500 for reconfiguring the spanning tree. The method 600 is described with respect to one or more of FIGS. 1-4c by way of example and not limitation.

At step 601, the flows are prioritized based on one or more of the flow statistics determined at step 501 in the method 500. For example, the flows are prioritized based on their flow volumes. Higher flow volumes are given a higher priority so they are assigned to shortest paths at step 602.

Multiple flow statistics may be used to prioritize flows. For example, flows may be first prioritized based on the type of data in the flows and/or the QoS requirements for the data transmitted in the flows. For example, the flow 131 shown in FIG. 2 carries VoIP data and streaming video. The VoIP may be given a higher priority over the streaming video because it requires lower latency and the users demand high-quality VoIP connections, for example, for their business telephone lines. Within the first prioritization, the flows are again prioritized based on the flow volumes. For example, flows having VoIP data are further prioritized based on their flow volumes. Streaming video, for example, is given the second highest priority and flows having streaming video are further prioritized based on their flow volumes. Other flow statistics may also be used to prioritize flows.

At step 602, the spanning tree is reconfigured based on the priorities determined at step 601. In one embodiment, an edge graph is created and flows are assigned to shortest paths based on priority. For example, the root node 110r or the computer system 400 stores a graph in adjacency list representation and flow characteristics, such as packet counts for each source and destination pair and type of data. Adjacency list representation includes a list of adjacent nodes for each node, which is determined using, for example, the 802.1D STP. The list of flows is sorted based on corresponding packet counts and data type, if data type was used to prioritize. The edge graph is a set of vertices, which are nodes in paths, and links connecting the nodes, which are the edges. Associate with each flow, starting with the highest priority flow, the edge set corresponding to the shortest path between the source and destination. The edge set is the set of links forming the shortest path. Starting from an empty graph, put in edges from the shortest paths of each flow in priority order such that it does not form a cycle, and then repeat until all the source and destination pairs are connected in the graph via edges. A shortest path is based on a network metric or a combination of network metrics, such as bandwidth, latency, etc. For example, a lowest latency path and/or a highest bandwidth path may be the shortest path. A known function, such as the red-blue rule in matroid theory or another known function may be used to build the edge graph. However, the known function uses as input the priorities determined based on the flow statistics to assign paths in the spanning tree to flows.

This method assigns flows to optimum paths in a spanning tree based on flow statistics. Determining which path is optimum for a particular flow may be based on predetermined flow statistics. In the example described above, QoS requirements for types of data in a flow and flow volumes are the predetermined flow statistics for prioritizing flows and assigning optimum paths based on the priority. An optimum path may be a shortest path in the network, where shortness of a path is based on one or more network metrics. For example, the reconfiguration results in a spanning tree that assigns highest priority flows to the shortest paths, which are likely paths with the greatest bandwidth and/or lowest latency. Furthermore, this method for assigning flows to paths minimizes the number of detour packets (packets not on the shortest path from the source to the destination), and thus achieves load sharing and minimizes delay for most packets. Furthermore, based on the flow statistics used to prioritize the flows, the spanning tree may be reconfigured to best satisfy an objective other than load sharing.

Figure 7:
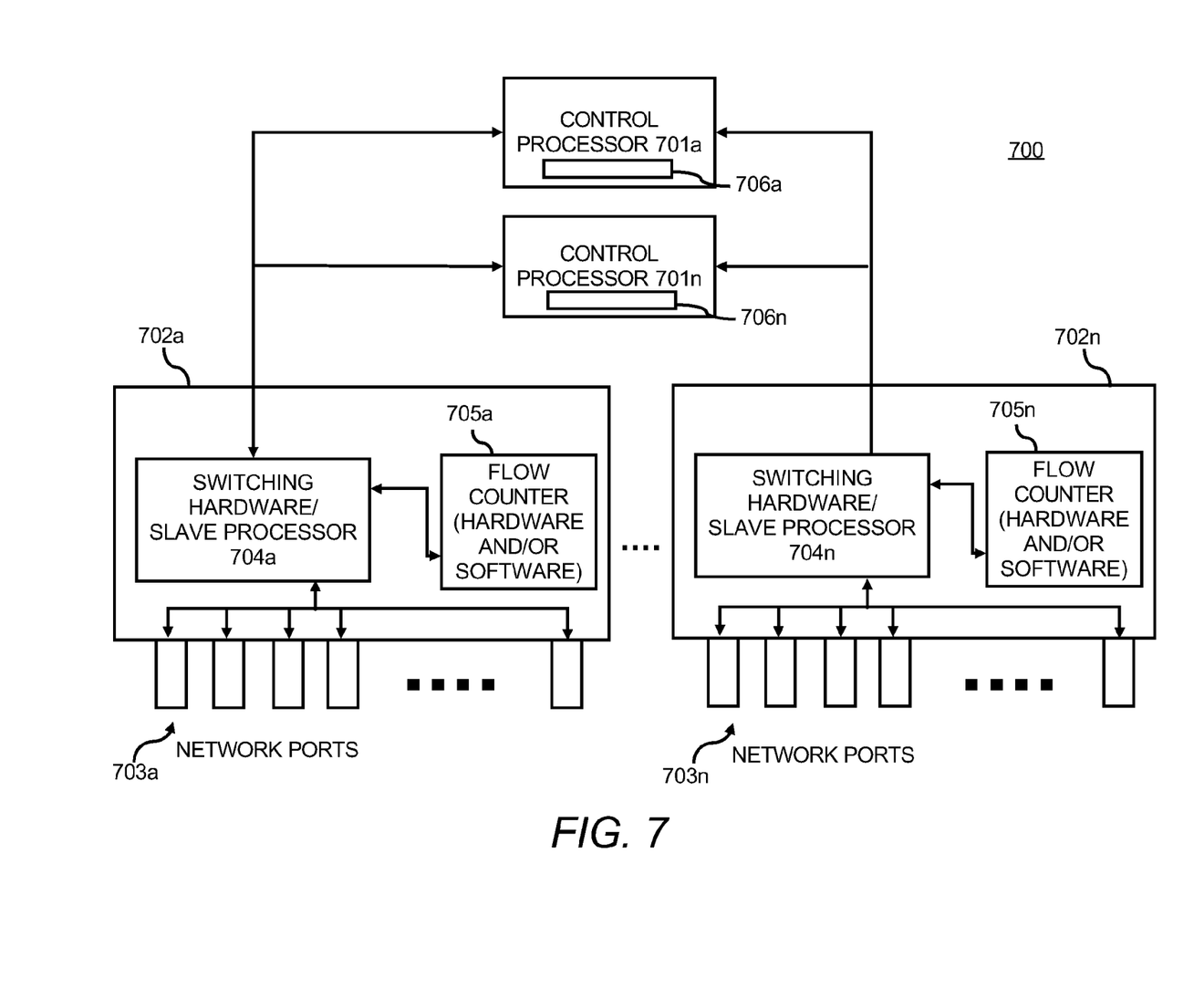
FIG. 7 illustrates a network switch, according to an embodiment.

FIG. 7 illustrates a block diagram of switch 700 that may be used for some of the nodes in the LAN 101, such as many of the nodes shown in FIGS. 1-4c. FIG. 7 is a high-level, generic block diagram of a switch, and the switch may include many conventional elements not shown.

The switch 700 includes one or more control processors 701 for performing routing in the switch and other known functions. The switch 700 also includes multiple line cards 702. Each line card includes ports 703, switching hardware/slave processor 704, and a flow counter 705 for counting packets for each flow. The control processors 701 may include memory 706 storing tables and storing software performing one or more of the steps described herein. The tables may include flow statistics, such as identifiers identifying each flow, volumes determined for each flow, network path measurements, such as number of hops, bandwidth, latency, etc., and other information. The flow statistics may be transmitted to a root node or another node for reconfiguring the spanning tree as described above. The software stored in memory in the switch 700 may include but is not limited to steps for determining flow volumes and other flow statistics and steps for reconfiguring the spanning tree, which may include one or more of the steps described with respect to methods 500 and 600. Also, hardware or a combination of hardware and software in the switch 700 may perform one or more of the steps described herein.

Figure 8:
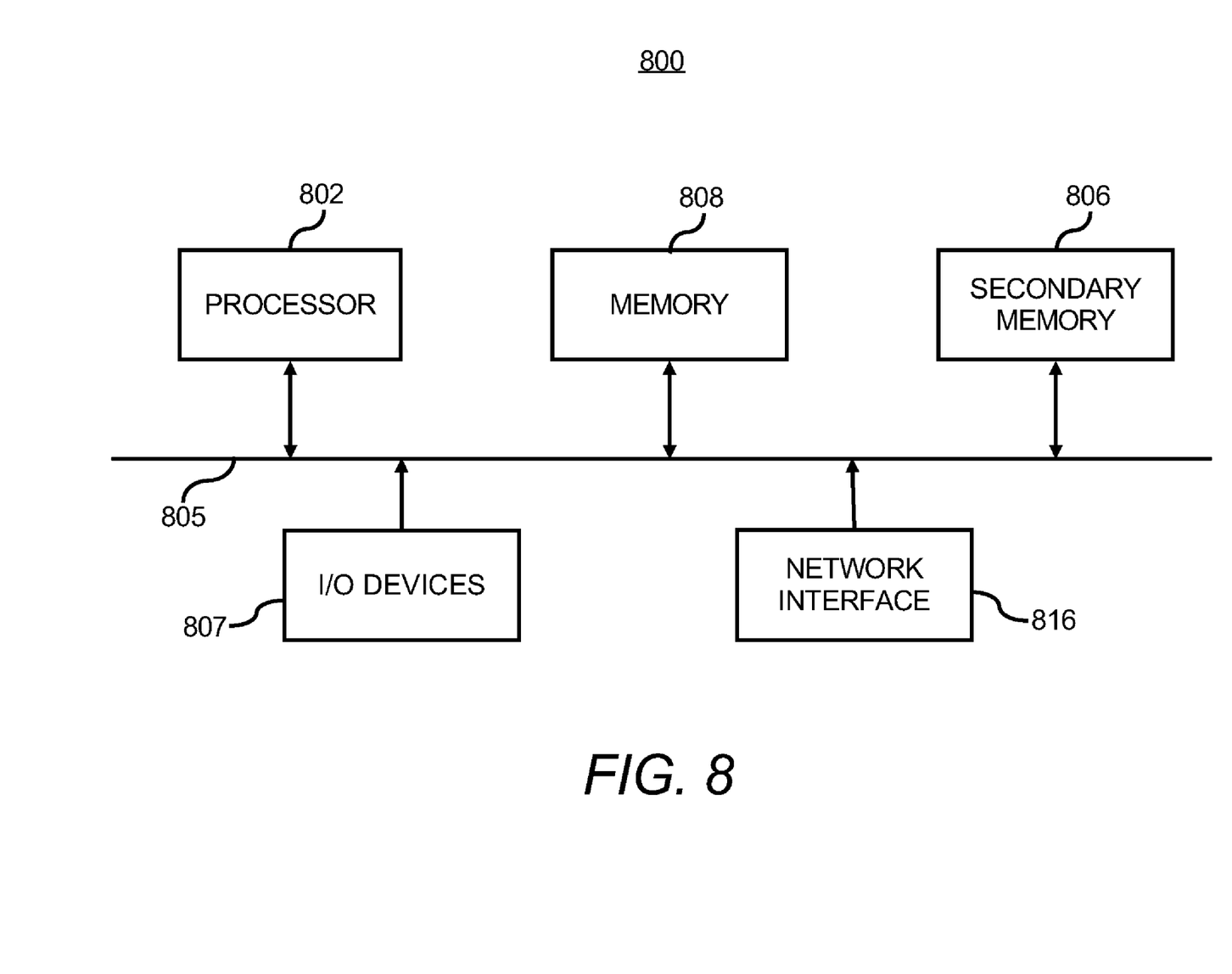
FIG. 8 illustrates a computer system, according to an embodiment.

FIG. 8 illustrates a block diagram of the computer system 400 shown in FIGS. 4a-b. The computer system 800 includes one or more processors, such as processor 802, providing an execution platform for executing software. Commands and data from the processor 802 are communicated over a communication bus 805. The computer system 800 also includes a main memory 808, such as a Random Access Memory (RAM), where software may be resident during runtime, and a secondary memory 806. The secondary memory 806 includes, for example, a hard disk drive and/or a removable storage drive, representing a floppy diskette drive, a magnetic tape drive, a compact disk drive, etc., or a nonvolatile memory where a copy of the software may be stored. The secondary memory 806 may also include ROM (read only memory), EPROM (erasable, programmable ROM), EEPROM (electrically erasable, programmable ROM). In addition to software for routing and other steps described herein, routing tables, capacities for overlay paths, available bandwidths for overlay paths, and other data may be stored in the main memory 808 and/or the secondary memory 806. The memories 808 and/or 806 may store network metric measurements, including feature vectors and measured available bandwidths.

A user interfaces with the computer system 800 with one or more I/O devices 807, such as a keyboard, a mouse, a stylus, display, and the like. A network interface 816 is provided for communicating with other nodes in the network 100.

One or more of the steps of the methods 500 and 600 and other steps described herein may be implemented as software, hardware or a combination of hardware and software. Software is embedded on a computer readable medium, such as memory and executed, for example, by a processor. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the scope of the claimed embodiments.

What is claimed is:

1. A method of load-aware spanning tree reconfiguration in a network, the method comprising:
   determining volumes of information flows of different types of data in an existing spanning tree in the network;
   prioritizing the information flows from a highest-priority information flow to a lowest-priority information flow, including
      prioritizing the information flows based on the types of data being transmitted in the information flows; and within each type of data, prioritizing the information flows based on the determined volumes of the information flows, wherein higher-volume information flows are given a higher priority; and reconfiguring the spanning tree based on the priorities of the information flows, including consecutively assigning a shortest path for each of the prioritized information flows in an order from the highest-priority information flow to the lowest-priority information flow.

2. The method of claim 1, further comprising:
determining whether any of the volumes exceeds a threshold; and
if any of the volumes exceed the threshold, performing the reconfiguration of the spanning tree.

3. The method of claim 1, wherein determining volumes for information flows comprises:
receiving the volumes, wherein the volumes are captured during one or more predetermined time intervals.

4. The method of claim 1, wherein determining volumes comprises:
counting a number of packets in each information flow.

5. The method of claim 4, wherein each information flow comprises the packets transmitted on a path in the spanning tree from a particular source to a particular destination, and each flow has a different source and destination pair.

6. The method of claim 5, wherein counting a number of packets in each information flow comprises:
parsing the header of each packet to identify a source address and a destination address;
identifying an information flow corresponding to the identified source address and destination address; and
incrementing a counter for the information flow.

7. The method of claim 6, wherein each switch in the spanning tree counts packets for any information flow passing through the switch, the method further comprising:
at a node in the network, receiving a count value for the counter from each switch incrementing a counter for an information flow; and
performing the reconfiguration of the spanning tree at the node based on the count values for the information flows.

8. The method of claim 1, wherein assigning a shortest path for each of the prioritized information flows comprises:
assigning a shortest path in the spanning tree to the highest priority information flow;
after the assigning for the highest priority information flow, assigning a shortest path in the spanning tree to a next highest priority information flow; and
consecutively repeating the assigning of a shortest path in the spanning tree to a next highest priority information flow for each remaining information flow in the spanning tree.

9. The method of claim 8, wherein prioritizing the information flows comprises:
prioritizing one or more of the information flows additionally based on QoS requirements for the one or more information flows.

10. The method of claim 9, wherein prioritizing the information flows comprises:
first prioritizing the one or more of the information flows based on the QoS requirements; and
within the first prioritization, prioritizing the one or more of the information flows based on the determined volumes.

11. The method of claim 1, wherein the network comprises a local area network and layer 2 switches in the OSI model.

12. A non-transitory computer readable storage device storing a computer program, the computer program including instructions that when executed by a processor implement a method of load-aware spanning tree reconfiguration in a network, the method comprising:
determining flow statistics including volumes of information flows of different types of data in an existing spanning tree in the network;
prioritizing the information flows from a highest-priority information flow to a lowest-priority information flow, including
prioritizing the information flows based on the types of data being transmitted in the information flows; and
within each type of data, prioritizing the information flows based on the determined flow statistics, wherein higher-volume information flows are given a higher priority; and
determining optimum paths for a new spanning tree based on the priorities of the information flows, including consecutively assigning a shortest path for each of the prioritized information flows in an order from the highest-priority information flow to the lowest-priority information flow.

13. The non-transitory computer readable storage device of claim 12, wherein prioritizing the information flows comprises:
first prioritizing the information flows based on QoS requirements; and
within the first prioritization, prioritizing the information flows based on the volumes.

14. The non-transitory computer readable storage device of claim 12, wherein determining optimum paths for a new spanning tree further comprises:
determining the optimum paths for the new spanning tree in response to at least one of the volumes exceeding a threshold.

15. The non-transitory computer readable storage device of claim 12, wherein determining optimum paths for a new spanning tree further comprises:
determining the optimum paths for the new spanning tree at a predetermined interval.

16. A node in a network comprising:
a memory storing flow statistics including volumes of information flows of different types of data in an existing spanning tree in the network; and
a processor prioritizing the information flows from a highest-priority information flow to a lowest-priority information flow, including
prioritizing the information flows based on the types of data being transmitted in the information flows,
within each type of data, prioritizing the information flows based on the determined flow statistics, wherein higher-volume information flows are given a higher priority, and
determining optimum paths for a new spanning tree based on the priorities of the information flows including consecutively assigning a shortest path for each of the prioritized information flows in an order from the highest-priority information flow to the lowest-priority information flow.

17. The node of claim 16, wherein the node is a network switch.

18. The node of claim 16, wherein the node is a computer system receiving the flow statistics and determining the optimum paths for the new spanning tree based on the flow statistics.

* * * * *